United States Patent

[11] 3,594,534

| [72] | Inventor | Edward Andrew Benfield |
| | | Chicago, Ill. |
| [21] | Appl. No. | 809,215 |
| [22] | Filed | Mar. 21, 1969 |
| [45] | Patented | July 20, 1971 |
| [73] | Assignee | Compak-O-Matic, Inc. |

[54] WELDING APPARATUS
8 Claims, 6 Drawing Figs.

[52] U.S. Cl. .................................................. 219/125, 219/76
[51] Int. Cl. .................................................. B23k 9/12
[50] Field of Search .................................... 219/125, 124, 130, 76, 60, 60.1

[56] References Cited
UNITED STATES PATENTS

| 2,930,883 | 3/1960 | Adamec | 219/125 |
| 3,215,812 | 11/1965 | Smith | 219/125 |
| 3,239,647 | 3/1966 | Iringer | 219/130 |
| 3,249,734 | 5/1966 | Meyer | 219/130 |
| 3,428,778 | 2/1969 | Blackman | 219/130 |
| 3,433,925 | 3/1969 | Benfield | 219/130 |
| 3,445,622 | 5/1969 | Hubbard | 219/130 |

*Primary Examiner*—Milton O. Hirshfield
*Assistant Examiner*—R. Skudy
*Attorney*—Allegretti, Newitt & Witcoff ABSTRACT: A welding device including a welding head and circular welding mechanism detachably secured thereto. The circular welding mechanism includes a barrel and a housing. The barrel is detachably secured to the housing and rotatably driven by a drive therein so as to make circular inside or outside welds on a workpiece. The barrel comprises a first connection end adapted to be secured to the housing and a second remote end telescopically and angularly adjustable with respect to the connection end.

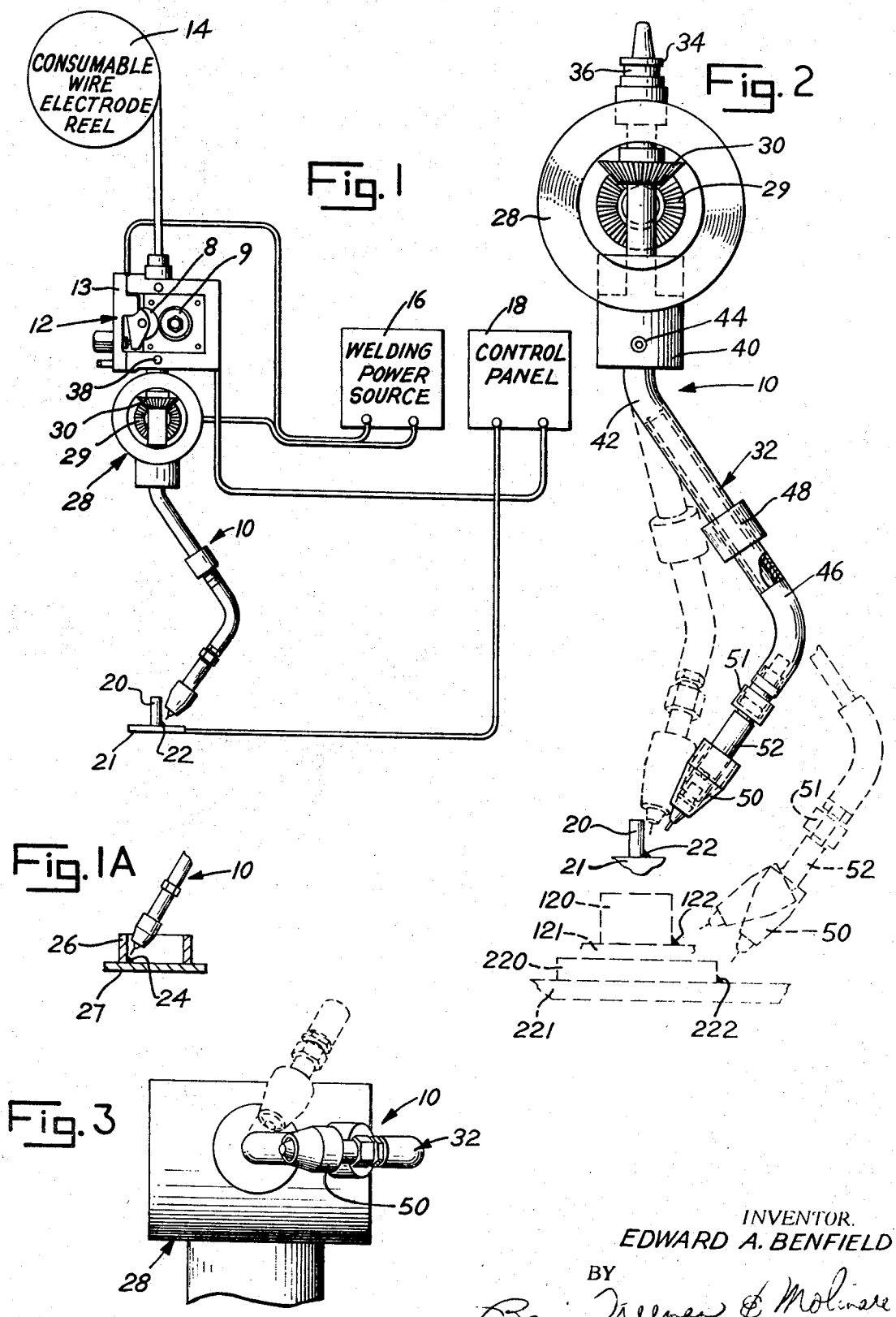

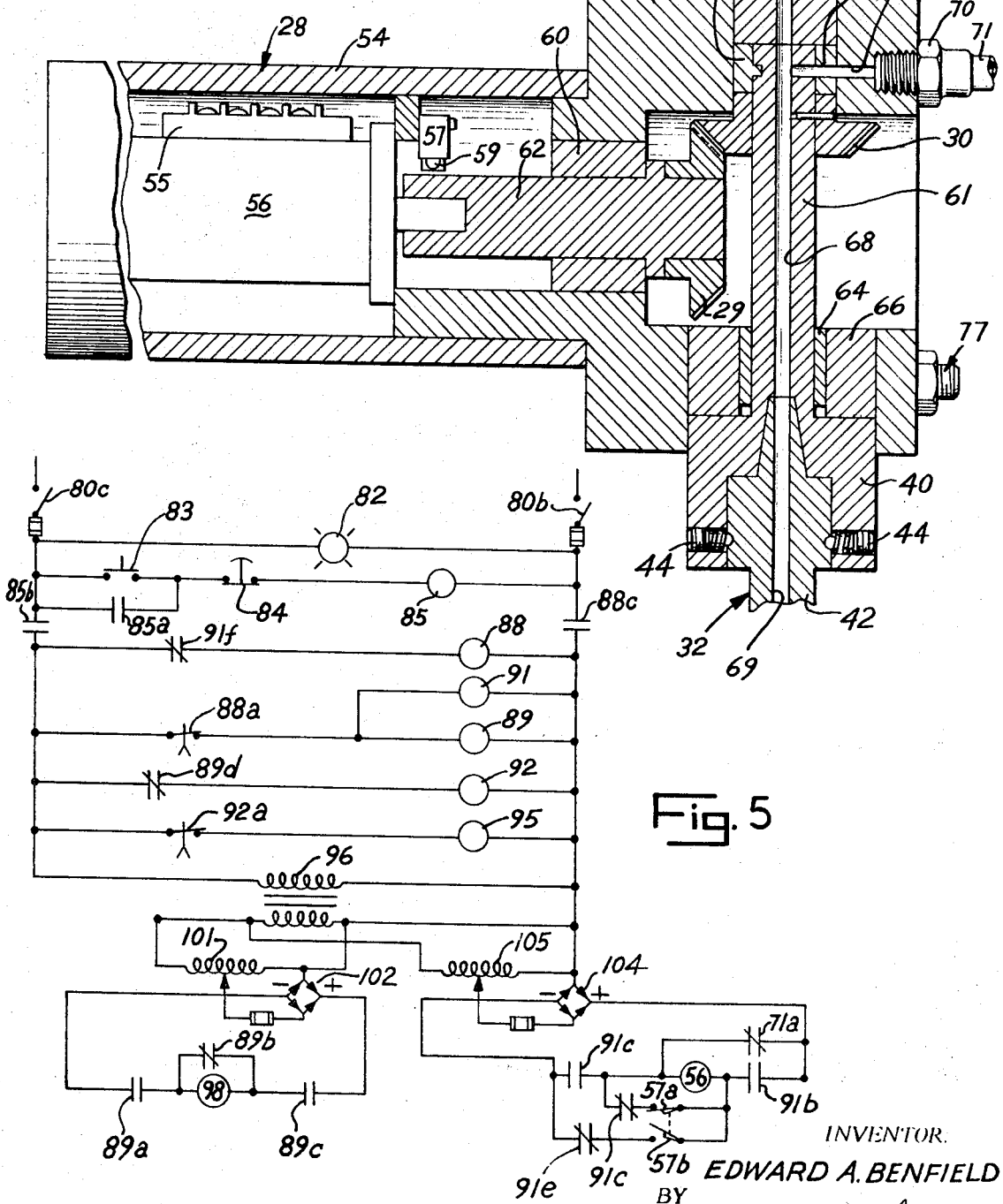

3,594,534

WELDING APPARATUS

BACKGROUND OF THE INVENTION

This invention relates to welding apparatus and, more particularly, to a compact attachment for for a welding unit capable of producing circular welds for both inside and outside diameters on cylindrical workpieces.

Heretofore, one method of welding circular piece parts together with fusion-welding processes required that the welding units including welding head or torch by physically rotated around the piece parts to be joined together. The piece parts were held on a fixed base. Much heavy fixturing was necessary in order to provide such movement. It was also necessary to include in the fixturing and the drive mechanism therefor means for adjusting the angle of impingement of the welding wire to the joint to be welded. These welding units, along with the special fixturing that was necessary, were basically single purpose machines, designed to weld particular piece parts and were not capable of use with a plurality of piece parts of different sizes. Thus, this type of equipment was not only expensive, but, also limited in scope.

Another method for welding together circular piece parts was to rotate piece parts under the welding unit. While this permitted the wire drive unit, that is the welding head or torch, to remain in a fixed predetermined position, it required cumbersome tooling and holding fixtures along with necessary drive mechanism to rotate not only the piece parts to be welded, but, also, the holding fixtures. At best, this arrangement was limited to piece parts that were of a configuration that lent themselves readily to being rotated, for example, relatively small objects. Large objects or angular pieces would not meet the requirement.

An object of the present invention is to provide novel welding apparatus which will overcome the disadvantages and deficiencies of prior constructions.

Another object of this invention is to provide improved welding apparatus for joining together piece parts with a circular weld, such welding apparatus comprising a circular welding mechanism that is simple, reliable and readily attached to and removed from a welding unit. Still another object is to provide improved circular welding apparatus for forming circular welds to join piece parts, the welding apparatus including adjustable barrel means to readily accommodate inside or outside diameters in a wide range. Other objects and advantages of the present invention will be made more apparent hereinafter.

BRIEF DESCRIPTION OF THE DRAWINGS

The attached drawing illustrates a presently preferred form of the present invention wherein:

FIG. 1 is a schematic representation of a welding system embodying the circular welding mechanism of the present invention, with the machine barrel of said circular welding mechanism shown in position for welding an outside circular weld;

FIG. 1a is a fragmentary view illustrating the machine barrel in position to weld an inside circular weld to join two piece parts;

FIG. 2 is an elevation view of the circular welding mechanism of the present invention, with different positions of the machine barrel being illustrated in dotted line for welding different diameter circular welds;

FIG. 3 is a bottom view of the circular welding mechanism of this invention;

FIG. 4 is a cross-sectional view of the circular welding mechanism illustrating the drive connection to the machine barrel; and FIG. 5 is a schematic wiring diagram of a circuit including the circular welding mechanism.

DESCRIPTION OF THE PREFERRED EMBODIMENT OF THE PRESENT INVENTION

Referring to FIG. 1 there is shown a welding system embodying the circular welding mechanism 10 of the present invention. The circular welding mechanism 10 is secured to a welding unit 12, which welding unit is adapted to receive wire from a suitable, consumable wire electrode reel 14. Drive means within housing 13 rotate rollers 8 and 9 which grip the wire between them and upon rotation move the wire from the reel 14 into the machine barrel. Power is supplied to the welding unit 12 from a suitable welding power source 16. Also provided in the welding system is a suitable control panel 18 containing the control circuit for controlling the operation of the welding unit 12 and the circular welding mechanism 10. As will be more clearly apparent from the following description, the circular welding mechanism 10 is adapted to weld together the piece parts 20 and 21 by providing an exterior circular weld indicated generally at 22.

Referring to FIG. 1a, there is illustrated the circular welding mechanism 10 in position for making an inside circular weld 24 so as to connect together the tubular piece part 26 and the planar piece part 27.

Referring now to FIGS. 2 and 3, there is better illustrated the circular welding mechanism 10. The circular welding mechanism 10 incorporates a drive motor within housing means 28, a right angle drive mechanism including the gears 29 and 30 and adjustable barrel means 32.

Extending upwardly from the housing means 28 is an inlet block 34 which is provided with a longitudinal opening therethrough for receiving welding wire from the electrode reel 14 and the welding unit 12 and communicating same to the machine barrel 32. Provided exteriorly in the inlet block 34 is an annular recess 36. As seen in FIG. 1, a setscrew 38 extends through the housing 13 of the welding unit 12 for engagement with the recess 36 in order to retain the circular welding mechanism 10 in the welding unit 12. The circular welding mechanism 10 may be readily attached to and removed from the welding unit 12 by removing the single fastener 38.

Depending from the housing unit 28 is an adapter block 40 which is adapted to be rotatably driven by the gear 30. The upper barrel portion or connection end 42 of machine barrel 32 is detachably connected to the adapter block by means of spring-loaded setscrew means 44. In the event the machine barrel strikes an obstruction during rotation, the setscrew means will yield to permit relative rotational movement of the machine barrel 32 with respect to adapter block 40 to prevent damage to the machine barrel. A lower machine barrel portion 46 is telescopically connected to the upper machine barrel portion 42 so as to be moved axially thereof and is secured in desired position by means of a connecting nut 48. Extending from the lower machine barrel portion 46 is a barrel tip 50 which is adapted to be connected to the lower machine barrel portion 46 by a barrel adapter 52 which may be straight, or which may be bent as indicated in dotted line in the lower right-hand side of FIG. 2 to provide for further adaptability and adjustability of location of the barrel tip 50. The barrel tip 50 which defines the remote end of the barrel 32, is located remotely form the upper barrel portion 42 and is adjustable rotatably with respect to the lower barrel portion 46 and retained in selected position by lock means 51. It will be understood that the upper barrel portion 42 and the lower barrel portion 46, the adapter 52 and the barrel tip 50 are hollow, so that the welding wire may extend therethrough and protrude suitably from the end of the barrel tip 50.

It is seen from FIG. 2 that the circular welding mechanism is disposed with respect to the piece parts to be welded so that the axis of rotation is over the center of the desired circular weld. The barrel tip 50 is then suitably positioned by means of extending or retracting the lower barrel portion 46 from the upper barrel portion 42 and properly positioning the barrel tip 50 with respect to lower barrel portion 46. Then the power is turned on. The drive motor within housing means 28 will rotate the gear 29, which in turn rotates the gear 30 to rotate the adapter 40 and the machine barrel 32 to make the circular weld.

Illustrated in FIG. 2 are the locations of the machine barrel for making three welds of different diameter. In the solid dine position, a small diameter external weld is being made. The dotted line view of the machine barrel 32 with respect to piece parts 20 and 21 shows a different position of the machine barrel during rotation thereof. The lower dotted line showings of the machine barrel 32 illustrate the positions of the machine tip 50 when making larger diameter circular welds on workpieces 120, 121 and 220, 221, respectively.

Turning to FIG. 4, it is seen that the housing means 28 for the circular welding mechanism 10 includes a tubular housing 54 having an electric drive motor 56 therein. Secured to the housing 54 is an end housing or body 58 having a radial bore therein for receiving a power shaft support bearing or bushing 60 that in turn receives a power shaft 62 that is connected at one end to the drive motor 56 and has secured thereto on the other end the bevel gear 29. The bevel gear 29 meshes with the bevel gear 30 on the upright shaft portion 61 of adapter block 40. The upper guide bearing or bushing 65 journals the upper part of shaft portion 61 in body 58. Lower guide bearing or bushing 64 journals the lower part of shaft portion 61 within the current transfer block 66 secured in the end housing or body 58.

There is an opening 67 in the inlet block 34 which communicates with an opening 68 through the shaft portion 61, which in turn communicates with an opening 69 in the upper barrel portion 42. As evident from the above discussion, consumable wire from the electrode 14 may be fed through the aligned openings 67, 68 and 69 into the machine barrel 32.

Provided within the housing 54 is a terminal strip 55 for permitting connection of the drive motor 56 in an electric control circuit. Also included in the electric control circuit is a limit switch 57 which is secured within the housing 54 in position to be engaged by an actuator 59 on the power shaft 62.

Gas is supplied to the circular welding mechanism through connection 70 which is connected to a supply conduit 71 that communicates with a source of gas, for example, argon, carbon dioxide or a mixture of the two. The gas enters the body 58 from connection 70 and passes through passage 74 in the body 58 and aligned passage 75 in upper guide bearing 65 into passages 68 and 69 for communication to the barrel tip 50 wherein the gas provides the desired shielding atmosphere about the wire at the welding point.

Electric current is supplied to body 58 from a power line that is suitably connected to the body 58, as, for example, by stud and nut means 77. Power is thus transferred from body 58 through transfer disc 66 to the current pickup block or adapter block 40 which is formed integral with shaft portion 61 or separately secured to shaft portion 61 so as to be rotatable therewith. The machine barrel 32 comprises parts 42, 46 and 50 defined by tubular metal liners. Within the liners are tubing made from a nonconductive plastic material, as, for example, Teflon When the wire passes through the barrel tip 50, it engages the tip and carries current from the tip, thus striking an arc when it engages the workpieces.

Referring now to FIG. 5, there is illustrated an electrical schematic wiring diagram for the circular winding mechanism of the present invention. Current is supplied to the control circuit from a suitable source of power, for example, a 115 volt alternating current supply. Contacts 80a and 80b control the flow of current from the power source to the circuit. When contacts 80a and 80b are closed, the pilot light 82 is lit. The circuit includes a start pushbutton 83, a stop-reset pushbutton 84 and a relay 85 in series with the pushbuttons. Energization of relay 85 will actuate normally open contacts 85, 85b and 85c. Included in the circuit are relays 88, 89, 91, 92 and 93 and their associated contacts.

Transformer 96 reduces the voltage to the control circuit for the circular welding mechanism drive motor 56 in housing 54 and that for the wire drive motor 98 which is housed in the welding unit housing 13. The control circuit for the wire drive motor 98 includes auto transformer 101, rectifier means 102 for converting AC current to DC current and relay contacts 89a, 89b and 89c. The control circuit for the circular welding unit drive motor 56 includes auto transformer 105 and rectifier means 104 for converting the AC current to DC current. Also in the circular welding mechanism drive motor circuit are limit switch contacts 57a and 57b and relay contacts 91a, 91b, 91c, 91d and 91e.

The sequence of operation will not be described for the circular welding operation. The power supply switch contacts 80a and 80b are closed. The operator closes pushbutton 83 energizing the relays 85, 88, 89, 91 and 93. Energization of relay 85 closes contacts 85a and 85c. When relay 89 is energized, contacts 89a and 89c are closed to energize the wire drive motor 98 and feed wire from the electrode reel 14. When the wire strikes the work parts, an arc is established.

With energization of relay 91, contacts 91b and 91c are closed energizing the drive motor 56 and contacts 91a, 91d, 91e and 91f are opened. The motor 56 will rotate the power shaft 62 and the gear means 29, 30 to rotate the machine barrel 32 in a circular path about the work parts to produce a circular weld. As the power shaft rotates, the limit switch contact 57a is opened, and the limit contact switch 57b is closed.

The relay 88 controls a time cycle, and when the contact 88a thereof is opened, relay 89 is deenergized. When relay 89 is deenergized, contacts 89a and 89c open, stopping the feed of wire and terminating the weld. At the same time, upon closing of contact 89d, relay 92 is energized starting a timing cycle. When relay 92 times out, contact 92a opens and the weld contactor relay 93 is deenergized. The drive motor 56 reverses the direction of travel, and the machine barrel 32 is driven by the power shaft 62 and the gears 29 and 30 back to the starting point. The reverse circuit for drive motor 56 is from the negative side of the rectifier means 104 through contact 91e, contact 57b, motor 56 and contact 91a to the positive side of the rectifier means 104. The reverse travel continues until the actuator cam 59 on the power shaft 62 opens the switch contact 57b and closes the switch contact 57a. The motor 56 is of the permanent magnet type and when the armature is shorted out, the motor is braked to a stop. The operator then presses the pushbutton 84 to reset the control circuit for the next cycle of operation.

From the foregoing, it has appeared that there has been provided by the present invention an improved welding apparatus including circular welding mechanism, which is compact, reliable and readily secured to and removed from a welding unit by a single fastener. The machine barrel is adjustable to accommodate a wide range of diameters of circular welds both of the inside and outside types. Since the tip of the machine barrel is rotated in a circular path, the piece parts to be joined by a weld may be fixed in a stationary manner by relatively simple holding fixtures. Welding current is supplied to the machine barrel, while it is in motion, so that when the wire touches the work, an arc will be struck. The current is transferred through the machine barrel to the barrel tip where the welding current is transferred to the consumable wire moving through same. In the case of a tungsten arc machine barrel, the current would be transferred to the tungsten and then through the arc to be piece parts. The electrical control sequencing determines the welding speed, and, also, the duration of the weld.

The machine barrel is releasably secured to the housing means 28 so that in the event the machine barrel 32 strikes an obstruction, the machine barrel can rotate with respect to the fixed housing means so as to prevent damage to the rotating parts.

While I have shown a presently preferred form of the invention, it will be understood that the invention is not limited thereto, since it may otherwise be embodied within the scope of the following claims.

I claim:

1. A welding device for welding circular welds with a length of welding wire comprising a welding head with an associated drive therein for feeding said welding wire, a circular mechanism detachably connected to said welding head, means for supplying inert gas to the circular welding mechanism, said circular welding mechanism including housing means containing motor drive, angle drive gearing, and an adapter driven by said drive gearing, said circular welding mechanism also including a hollow barrel having a connection end connected to the adapter for rotation therewith, and a remote end, the remote end being disposed at an angle with respect to said connection end for effecting a circular weld as the adapter and barrel are rotated.

2. A welding device as in claim 1 wherein the remote end is telescopically secured to said connection end so as to selectively position the tip of the remote end at a selected adjusted position.

3. A welding device as in claim 1 wherein the remote end is both telescopically and angularly adjustable with respect to the connection end.

4. A welding device as in claim 1 wherein the remote end is telescopically adjustable with respect to the welding head to accommodate different size workpieces and is angularly and rotatably adjustably with respect to the connection end for making either inside or outside welds.

5. A welding device as in claim 1 including fastening means detachably joining the adapter and connection end of the barrel.

6. A welding device as in claim 5, wherein the adapter has an opening therethrough and the housing means includes an inlet block having a longitudinal opening for receiving welding wire from the welding head, a hollow shaft rotated by the angle gearing having an opening therethrough, said shaft opening communicating at one end with the inlet block opening and at the other end with the adapter opening, whereby welding wire may be fed through the openings in the inlet block, hollow shaft and adapter into the barrel, which openings are aligned.

7. A welding device as in claim 6 wherein said inert-gas-supplying means includes a connection on said housing means communicating with said aligned openings in the hollow shaft and adapter to the hollow barrel for discharge from the said remote end to provide a desired shielded atmosphere about the welding wire at the place of welding.

8. A welding device as in claim 6 wherein power means are connected to the housing means for receiving power from a source, and communicating same to the adapter, the adapter and the barrel both being electrically conductive, whereby welding wire passing from the remote end of the barrel engages the remote end and carries current therefrom, thus striking an arc when the welding wire engages the work to be welded.